US011568276B1

(12) United States Patent
Goto et al.

(10) Patent No.: US 11,568,276 B1
(45) Date of Patent: Jan. 31, 2023

(54) ADAPTIVE DOCUMENT UNDERSTANDING

(71) Applicant: International Business Machines Corporation, Armonk, NY (US)

(72) Inventors: Takuya Goto, Tokyo (JP); Tohru Hasegawa, Tokyo (JP); Xiangning Liu, Tokyo (JP); Asako Ono, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 17/411,534

(22) Filed: Aug. 25, 2021

(51) Int. Cl.
*G06F 7/02* (2006.01)
*G06F 16/00* (2019.01)
*G06N 5/02* (2006.01)
*G06F 16/93* (2019.01)
*G06F 16/25* (2019.01)
*G06F 16/28* (2019.01)

(52) U.S. Cl.
CPC .......... *G06N 5/022* (2013.01); *G06F 16/258* (2019.01); *G06F 16/285* (2019.01); *G06F 16/93* (2019.01)

(58) Field of Classification Search
CPC ....... G06N 5/022; G06F 16/285; G06F 16/93; G06F 16/258
See application file for complete search history.

(56) References Cited

U.S. PATENT DOCUMENTS

| 2017/0169103 | A1 | 6/2017 | Juneja |
| 2018/0039907 | A1 | 2/2018 | Kraley |
| 2021/0271805 | A1* | 9/2021 | Comeau .................. G06F 40/16 |
| 2022/0237373 | A1* | 7/2022 | Singh Bawa ......... G06F 16/355 |
| 2022/0245378 | A1* | 8/2022 | Bradley, III ......... G06V 30/416 |

FOREIGN PATENT DOCUMENTS

| JP | 06203018 A | 7/1994 |
| JP | 10154204 A | 6/1998 |
| JP | 10240958 A | 9/1998 |
| JP | 2001034154 A | 2/2001 |
| JP | 2006349836 A | 12/2006 |

(Continued)

OTHER PUBLICATIONS

Li, Tao et al, "Document Clustering via Adaptive Subspace Iteration," SIGIR '04 Jul. 25-29, 2004 (Year: 2004).*

(Continued)

*Primary Examiner* — Bruce M Moser
(74) *Attorney, Agent, or Firm* — VanLeeuwen & VanLeeuwen; Kimberly Zillig

(57) ABSTRACT

An approach is provided in which a method, system, and program create a plurality of page clusters in feature space from a plurality of feature vectors corresponding to a plurality of unstructured pages. The method, system, and program product assign one of a plurality of machine learning models to each one of the plurality of page clusters based on a relationship in the feature space between the plurality of page clusters and a plurality of training clusters corresponding to the plurality of machine learning models. The method, system, and program product identify one of the plurality of page clusters that corresponds to a selected one of the plurality of unstructured pages, and transform the selected unstructured page into a structured page using a selected one of the plurality of machine learning models assigned to the identified page cluster.

25 Claims, 11 Drawing Sheets

(56) References Cited

FOREIGN PATENT DOCUMENTS

| | | |
|---|---|---|
| JP | 2009500755 A | 1/2009 |
| JP | 2014115781 A1 | 6/2014 |
| JP | 2016126796 A | 7/2016 |

OTHER PUBLICATIONS

Sadeghian et al., "Document Clustering Using Gravitational Ensemble Clustering," 2015 The International Symposium on Artificial Intelligence and Signal Processing (AISP), Mashhad, Iran, Jun. 2015, pp. 240-245.

Toshniwal et al., "Shape pattern matching: A tool to cluster unstructured text documents," Journal of Computational Methods in Sciences and Engineering 10 (2010), Sep. 2010, pp. S73-S84.

Thirumoorthy et al., "Unstructured Text Document Clustering using Text mining methods," International Journal of Pure and Applied Mathematics, vol. 119 No. 12, Jan. 2018, pp. 13585-13591.

\* cited by examiner

ADAPTIVE DOCUMENT UNDERSTANDING

BACKGROUND

Machine learning algorithms build machine learning models based on sample data, known as training data, to make predictions or decisions without being explicitly programmed. The process of training a machine learning model involves providing a machine learning algorithm with the training data from which to learn, and the artifact created from the training process is the machine learning model. The training data includes correct answers that are referred to as targets or target attributes, and the machine learning algorithm finds patterns in the training data that map input data attributes to the target attributes and outputs a machine learning model that captures the patterns.

Structured data refers to data that resides in fixed fields within a file or record and is therefore straightforward to analyze. Unstructured data (or unstructured information) is information that either does not have a pre-defined data model or is not organized in a pre-defined manner. Unstructured information is typically text-intensive but may include data such as dates, numbers, and etcetera. In addition, unstructured data typically has irregularities and ambiguities, which traditional programs have difficulty interpreting.

Smart Document Understanding (SDU) approaches convert an unstructured document into structured data via machine learning. In SDU, a user enters annotations on training documents extracted from input documents, and a model is trained using the documents as teaching images. However, a challenge found with current SDU systems is that the page format is often different between pages and various articles. Some pages may be in a 2-column format, other pages may include graphical images, while other pages may be traditional paragraph-based letters.

As such, using a single machine learning model to cover the various page formats is difficult and results in a decrease in conversion accuracy. In addition, existing SDU training approaches have a minimal amount of training data extraction that are effective for training a machine learning model (e.g., random sampling). As such, documents may be selected with biased toward a particular format, which also results in a decrease in conversion accuracy of the machine learning model.

BRIEF SUMMARY

According to one embodiment of the present disclosure, an approach is provided in which a method, system, and program create multiple clusters in feature space from multiple feature vectors corresponding to multiple unstructured pages. The method, system, and program product assign one of multiple machine learning models to each one of the multiple clusters based on a relationship in the feature space between the multiple page clusters and multiple training clusters corresponding to the multiple machine learning models. The method, system, and program product identify one of the multiple page clusters that corresponds to a selected one of the multiple unstructured pages, and transforms the selected unstructured page into a structured page using a selected one of the multiple machine learning models assigned to the identified page cluster. In this embodiment, the method, system, and program product enhance data conversion accuracy by adaptively selecting a best-fit machine learning model, from multiple machine learning models, to transform unstructured data to structured data.

According to another embodiment of the present disclosure, an approach is provided in which a method, system, and program product divide multiple unstructured documents into the multiple unstructured pages. The method, system, and program product select one of the multiple unstructured pages and define a set of character areas and a corresponding set of positions in the selected unstructured page. The method, system, and program product compute a set of character area feature vectors corresponding to the set of character areas based on their corresponding set of positions and a set of content within their corresponding character area. In this embodiment, the method, system, and program product compute multiple fine-tuned feature vectors for each unstructured page based on content type and positioning within the page.

According to another embodiment of the present disclosure, an approach is provided in which a method, system, and program product compute a selected one of the multiple feature vectors for the selected unstructured page based on the set of character area feature vectors and map the selected feature vector to the feature space. In this embodiment, the method, system, and program product combine the multiple feature vectors for a particular unstructured page into a fine-tuned single page feature vector that best describes the content type and content positioning in the unstructured page.

According to another embodiment of the present disclosure, an approach is provided in which a method, system, and program product perform hierarchical clustering on the selected feature vector. The method, system, and program product identify one of multiple page cluster centers corresponding to the multiple page clusters that are closest in feature space to the selected feature vector. The method, system, and program product add the selected feature vector to an identified one of the multiple page clusters corresponding to the identified page cluster center. In this embodiment, the method, system, and program product group page feature vectors into clusters based on their comparable features that are eventually assigned to a specific one of the multiple machine learning models.

According to another embodiment of the present disclosure, an approach is provided in which a method, system, and program product compute multiple page cluster centers based on the multiple page clusters. The method, system, and program product compute multiple training cluster centers based on the multiple training clusters. The method, system, and program product select one of the multiple page cluster centers. The method, system, and program product identify one of the multiple training cluster centers closest to the selected page cluster center in the feature space. The method, system, and program product assign one of the multiple machine learning models that corresponds to the identified training center cluster to the page cluster corresponding to the selected page cluster center. In this embodiment, the method, system, and program product adaptively assign each of the machine learning models to specific page cluster centers so that each page cluster uses its own machine learning model to convert unstructured data to structured data.

According to another embodiment of the present disclosure, an approach is provided in which a method, system, and program product identify a different one of the multiple page clusters that corresponds to a different one of the multiple unstructured pages. The method, system, and program product transform the different unstructured page into a different structured page using a different one of the multiple machine learning models assigned to the different page cluster. In this embodiment, the method, system, and program product use a different machine learning model to convert a different unstructured page to a structured page when the different unstructured page has different features from the previously converted unstructured page.

According to another embodiment of the present disclosure, an approach is provided in which a method, system, and program product train the selected machine learning model using a portion of the multiple unstructured documents corresponding to the identified page cluster. The method, system, and program product perform the transforming using the trained machine learning model, and add the trained machine learning model to the multiple machine learning models. In this embodiment, the method, system, and program product further train each of the machine learning models on a portion of the unstructured pages to better refine the conversion capabilities of each of the machine learning models.

According to another embodiment of the present disclosure, an approach is provided in which the multiple unstructured pages comprises multiple unstructured page types, and wherein each one of the multiple unstructured page types is assigned one of the multiple machine learning models to perform the transforming. In this embodiment, the method, system, and program product assigns a specific machine learning model to transform each a specific unstructured page to a structured page based on the type of the unstructured page.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
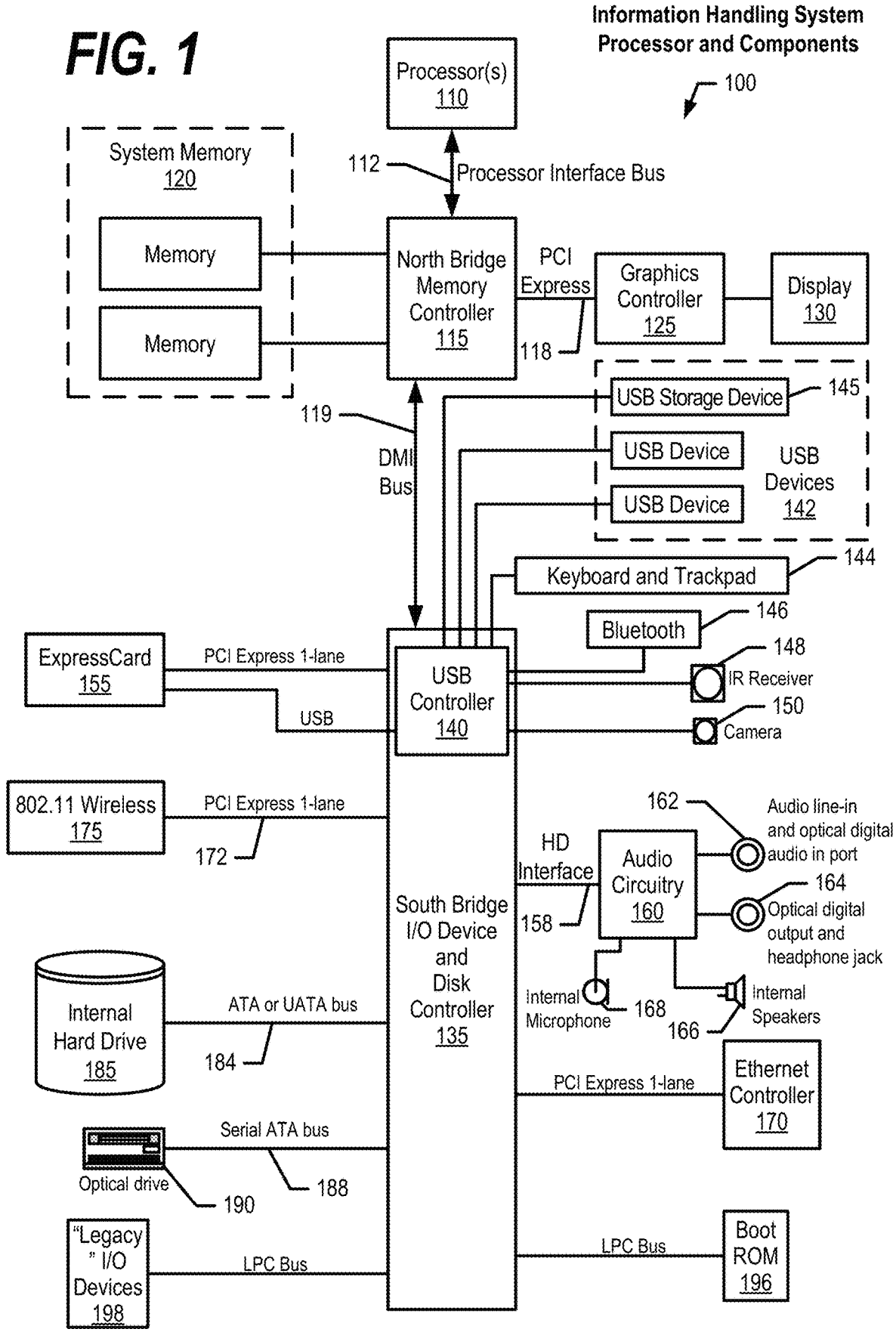
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalitalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
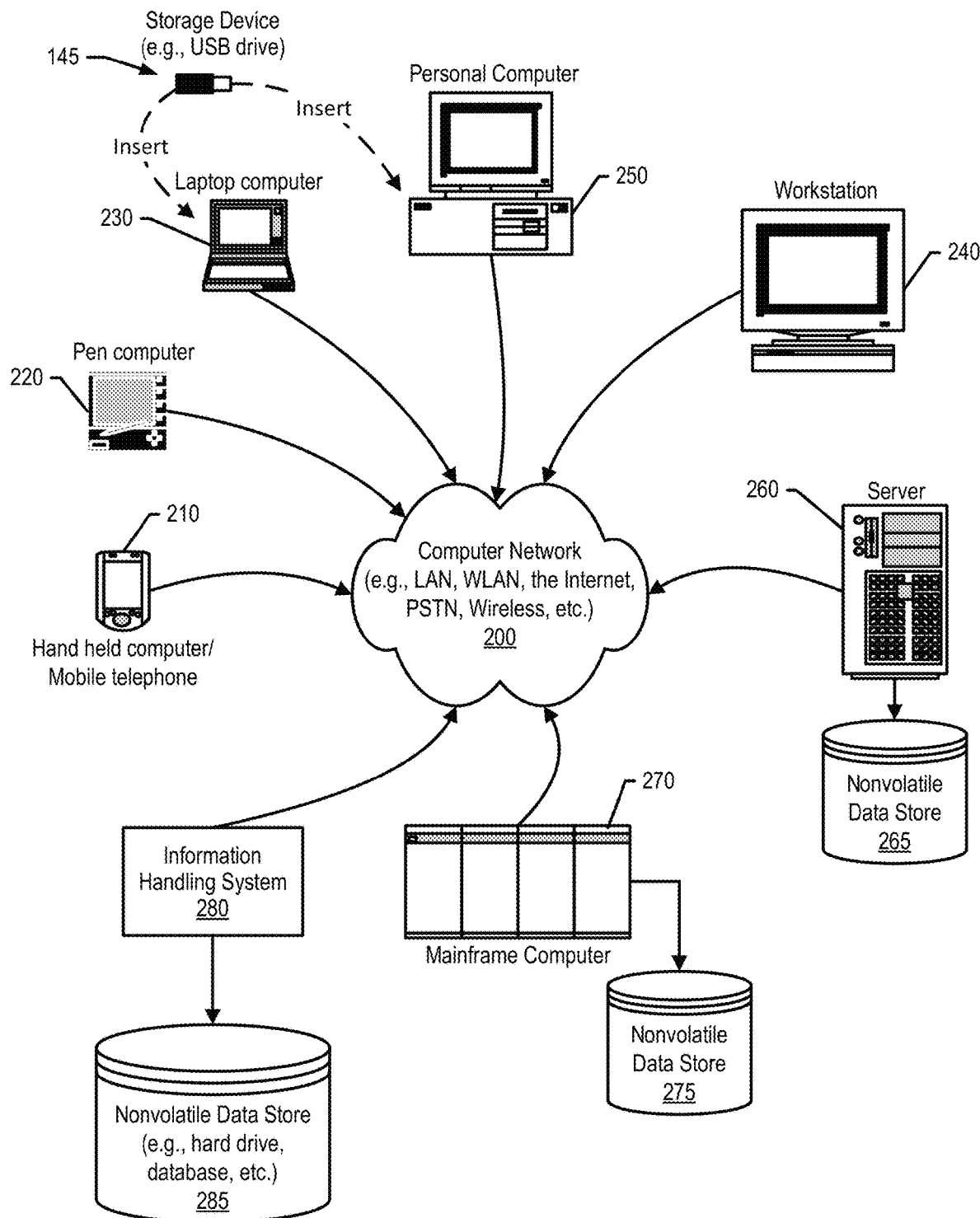
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, unstructured data comes in many different formats, but existing Smart Document Understanding (SDU) approaches have minimal training data extraction methods for training. As such, documents may be selected with the selection biased toward a non-optimal format, resulting in a decrease in conversion accuracy. FIGS. 3 through 11 depict an approach that can be executed on an information handling system that enhances conversion accuracy by adaptively training multiple machine learning models and selecting a best-fit machine learning model to transform unstructured data to structured data. The approach automatically converts documents into feature data (feature vectors) based on character areas; clusters the feature vectors in feature space based on the formats; and trains multiple machine learning models dedicated to their respective formats based on the clustering.

Then, once the machine learning models are trained, the approach adaptively selects a best-fit machine learning model to transform a particular page of unstructured data to structured data based on the page's feature vector mapped into the feature space. In one embodiment, clustering is performed using the degrees of similarity among images or the degrees of similarity among words in sentences. In another embodiment, more significant divisional models are created from clustering by using feature values for format extraction. In this embodiment, the feature values are used in common with subsequent format extraction, therefore shortening time, saving resources, and providing a high affinity with applications.

Figure 3:
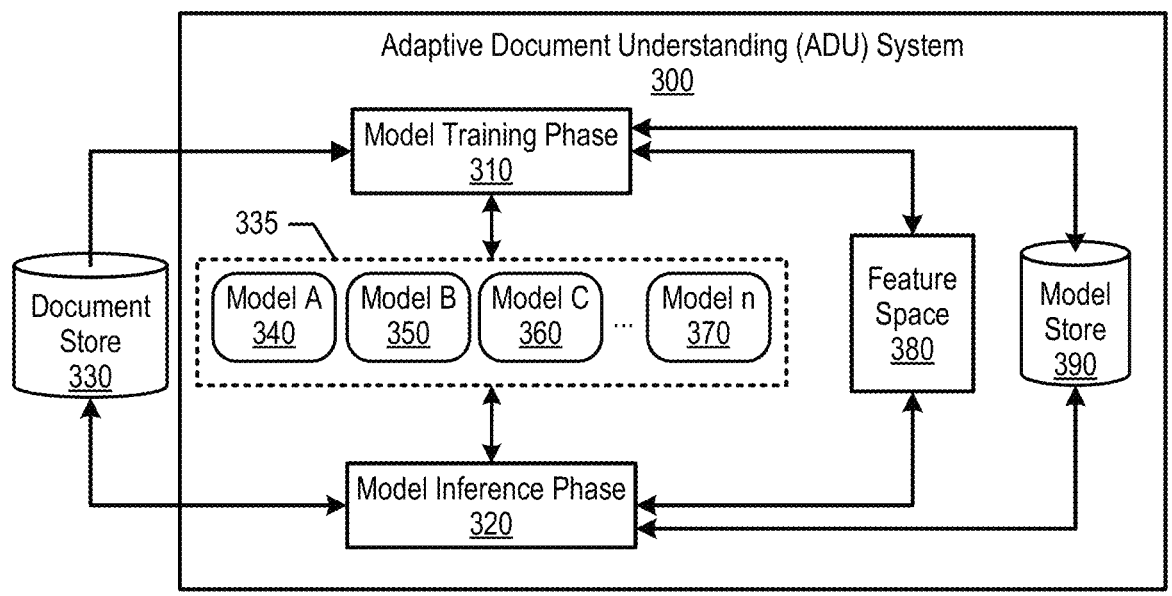
FIG. 3 is an exemplary diagram depicting adaptive document understanding system that trains machine learning models and utilizes the trained machine learning models for structure extraction.

FIG. 3 is an exemplary diagram depicting an adaptive document understanding system that trains multiple machine learning models and utilizes the trained machine learning models to intelligently transform unstructured data to structured data. Adaptive document understanding (ADU) system 300 includes two phases, which are model training phase 310 and model inference phase 320. As discussed herein, model training phase 310 trains models 335 independently, which include model A 340, model B 350, model C 360, and model n 370. Model inference phase 320 then uses models 335 to transform unstructured data in document store 330 into structured data.

Document store 330 includes a variety of unstructured document types, such as 2-column format articles, financial articles with graphical images, and traditional paragraph-based letters. Model training phase 310 divides the documents from document store 330 into pages, and then extracts characters from each of the pages (sections of text, images, etc.). Model training phase 310 converts each of the pages into feature data (vectors) that indicate a format based on information pertaining to the sizes and positions of the extracted characters of the page and stores the feature information in feature space 380. Model training phase 310 then divides the pages into clusters based on the feature data via hierarchical clustering and determines gravity centers for each page cluster, referred to herein as page cluster centers or page cluster center vectors (see FIGS. 4, 6, 7, 10, and corresponding text for further details).

Next, model training phase 310 compares in feature space the page cluster centers against training cluster centers. The training cluster centers correspond to training clusters that were utilized to initially train machine learning models 335. Model training phase 310 then assigns one of machine learning models 335 as a base model for each of the page cluster centers (see FIG. 10 and corresponding text for further details).

Next, model training phase 310 randomly extracts unstructured pages from each of the page clusters, and enters annotations into the extracted unstructured pages. Then, model training phase 310 trains models 340, 350, 360, and 370 for their respective page clusters using the annotated unstructured pages. For example, if model A 340 is assigned to page cluster A 1000 from FIG. 10, model A 340 is then trained on the annotated unstructured pages randomly extracted from page cluster A 1000. Model training phase 310 then stores models 335 and their corresponding cluster center vectors in model store 390.

In one embodiment, models 335 have a predisposition for various content types, such as imaging, text, etc. In this embodiment, adaptive document understanding system 300 selects which one of models 335 fits best with a particular cluster based on the cluster's position in feature space 380 (e.g., cluster with high image feature value is assigned to an image-based machine learning model).

Once models 335 complete training, model inference phase 320 divides the documents from document store 330 into pages, or uses the pages as-is if they are already divided by model training phage 310. Then, model inference phase 320 selects one of the pages, extracts characters from the selected page, and converts the selected page into feature data (vector) that indicate a format of the selected page based on information on the sizes and positions of the extracted characters of the page (see FIG. 9 and corresponding text for further details).

Figure 11:
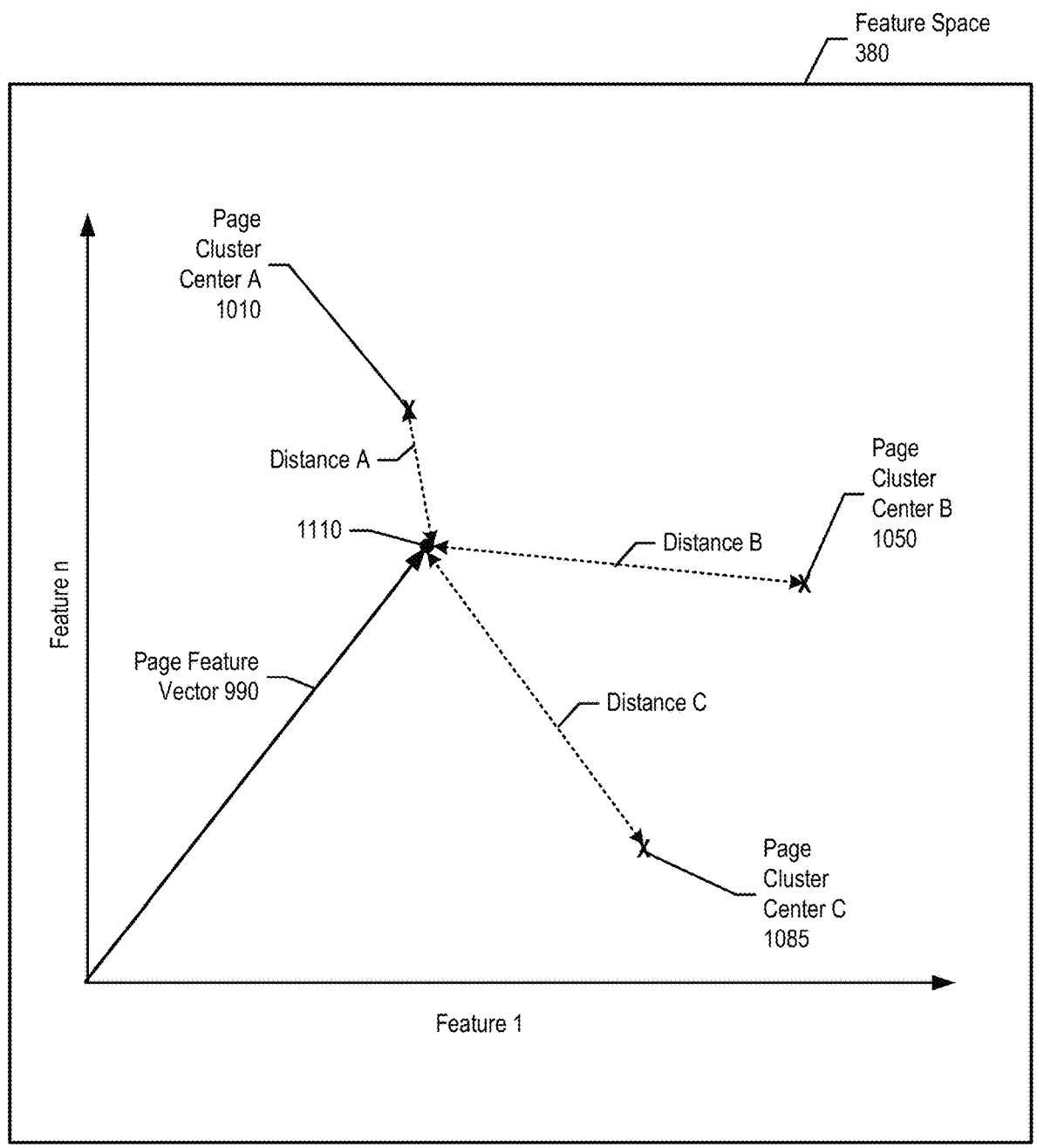
FIG. 11 is an exemplary diagram depicting adaptive document understanding system 300 mapping a page feature vector to feature space and selecting a machine learning to apply to the page based on distance measurements from cluster centers.

Then, model inference phase 320 maps the selected page's feature vector to feature space 380 and identifies a closet page cluster center in model store 390 (see FIG. 11 and corresponding text for further details). Model inference phase 320 then selects one of models 335 that correspond to the closest page cluster center from model store 390. In turn, model inference phase 320 uses the selected one of models 335 to transform the selected unstructured page to structured data.

Model inference phase 320 then selects a different unstructured page in document store 330, selects a best-fit model for the different page, and transforms the different unstructured page to a different structured page using the selected best-fit model. Model inference phase repeats this process and selects a best-fit model to transform each of the unstructured pages in document store 330 into structured pages (see FIG. 5 and corresponding text for further details).

Figure 4:
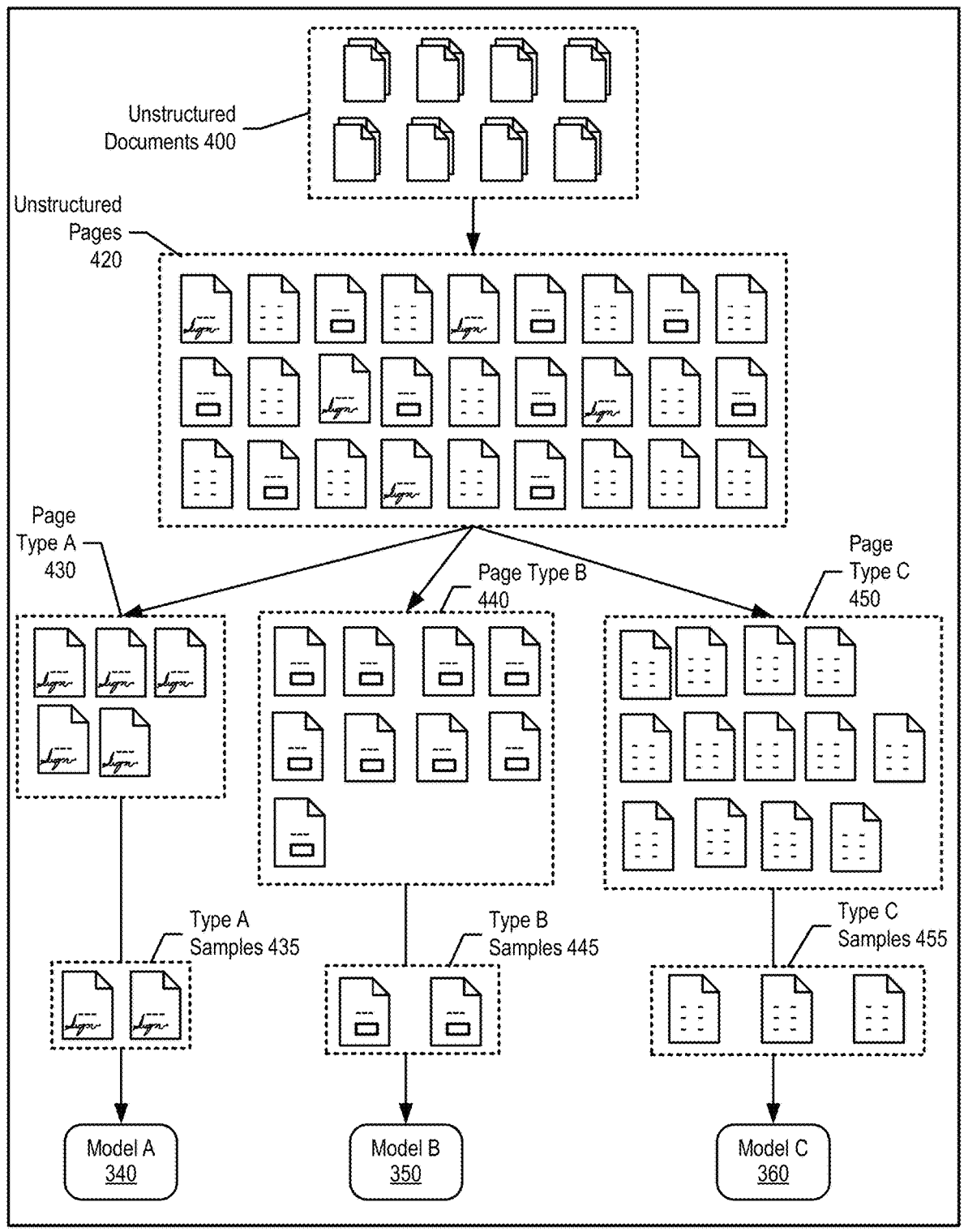
FIG. 4 is an exemplary diagram depicting adaptive document understanding system 300 using unstructured documents to train models 335.

FIG. 4 is an exemplary diagram depicting adaptive document understanding system 300 using unstructured documents to select and train models 335. Adaptive document understanding system 300, particularly model training phase 310, divides unstructured documents 400 into a page set $(d_{i,p})$ of unstructured pages 420, where i is an index of documents and p is an index of pages.

Adaptive document understanding system 300 then extracts character areas from each of unstructured pages 420 using, in one embodiment, conventional OCR techniques or existing techniques implemented in an SDU. Optical character recognition (OCR) is a conversion of images of typed, handwritten, or printed text into machine-encoded text, whether from a scanned document, a photo of a document, a scene-photo, or from subtitle text superimposed on an image.

Figure 9:
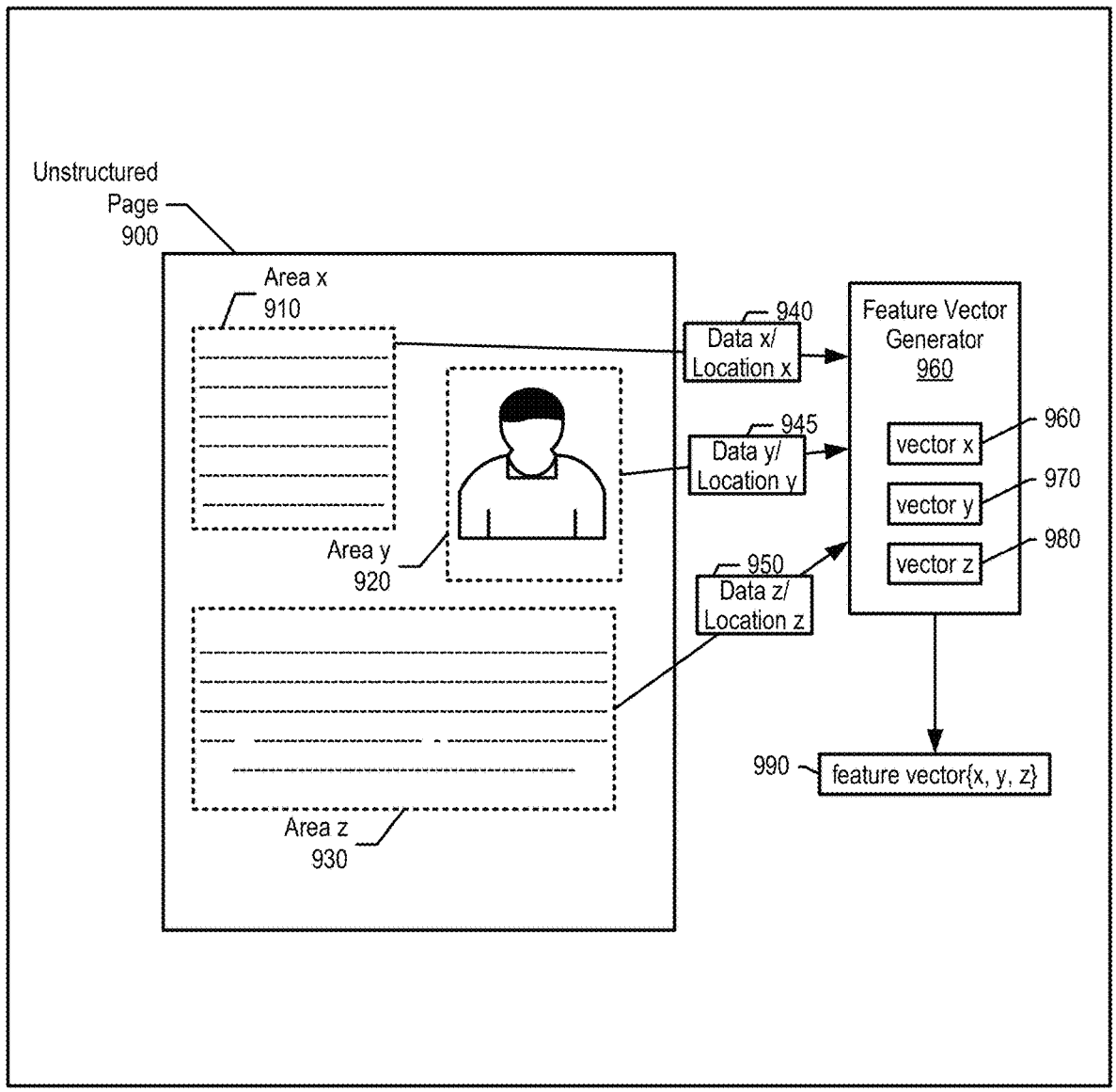
FIG. 9 is an exemplary diagram depicting adaptive document understanding system 300 segmenting a page into character areas, creating character area feature vectors for the character areas, and creating a page feature vector from the character area feature vectors.

For each page in unstructured pages 420, adaptive document understanding system 300 converts the character areas into feature data $F=\{f_{i,p}\}$ each indicating a format (e.g., the number of character areas, the positions of the areas, the sizes of the areas and the sizes of the characters) (see FIG. 9 and corresponding text for further details).

Adaptive document understanding system 300 maps each of the feature vectors into feature space 380. Adaptive document understanding system 300 then segments unstructured pages 420 into clusters based on their feature mappings. For example, image intensive pages are mapped to a particular area of feature space 380, and text intensive pages are mapped to a different area of feature space 380. Adaptive document understanding system 300's feature vectors also take into account the location of the images and text on pages during the mapping (see FIGS. 9, 10, and corresponding text for further details). FIG. 4 shows the results of the feature space clustering as page type A 430, page type B 440, and page type C 450.

Figure 7:
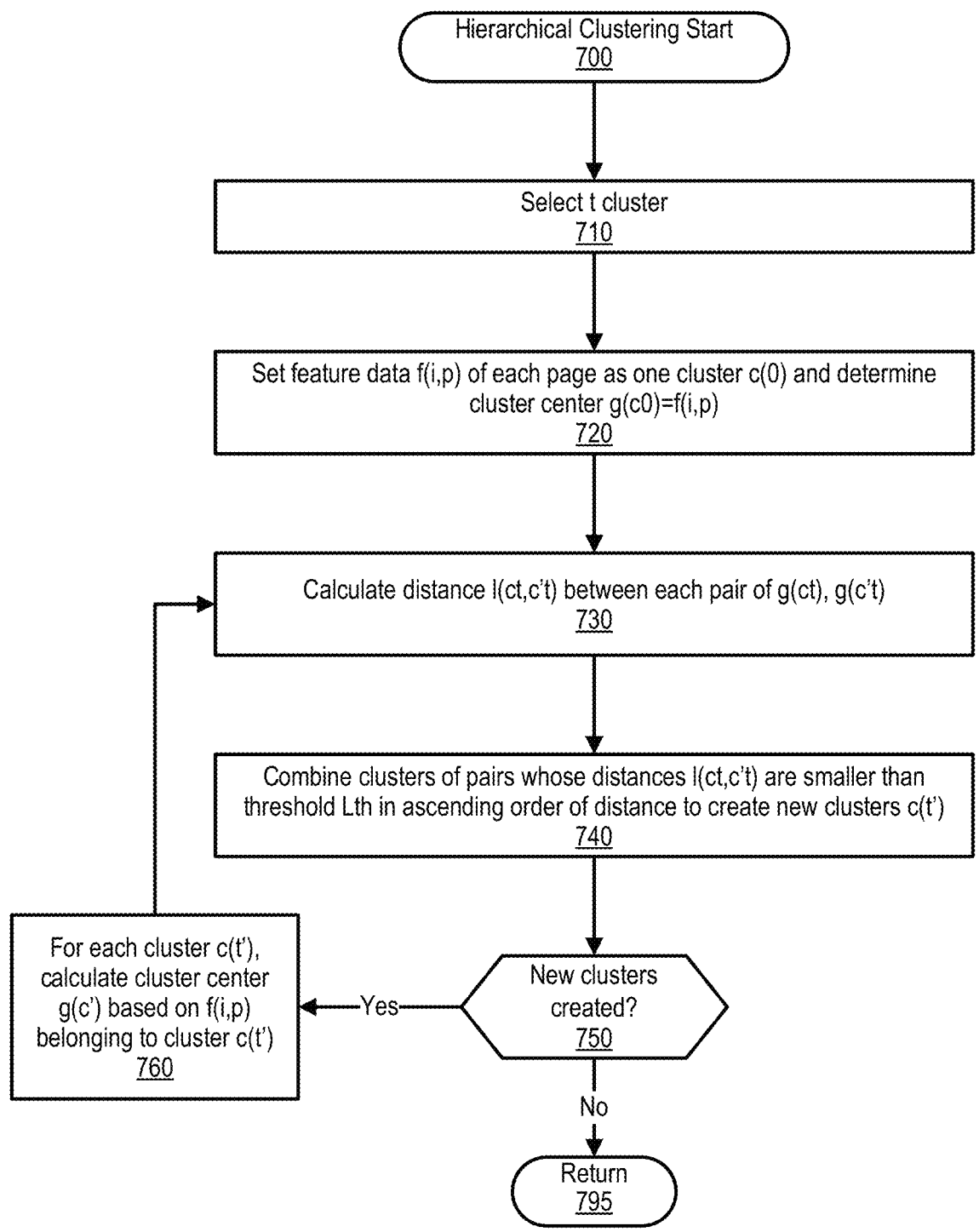
FIG. 7 is an exemplary flowchart showing steps taken in hierarchical clustering.

In one embodiment, adaptive document understanding system 300 creates an optimum number of page clusters (430, 440, 450) that are efficient for training by dividing unstructured pages 420 into documents having distances (differences) of no less than a threshold Lth from one another based on the feature data F via hierarchical clustering (see FIG. 7 and corresponding text for further details).

Adaptive document understanding system 300 compares the page cluster centers against training cluster centers that correspond to training clusters that were utilized to initially train machine learning models 335. Adaptive document understanding system 300 then assigns one of machine learning models 335 as a base model for each of the page cluster centers (see FIG. 10 and corresponding text for further details).

Adaptive document understanding system 300 randomly extracts training page samples 435, 445, and 455 from the page clusters, makes annotations on each of the extracted training page samples, and trains model A 340, model B 350, and model C 360, respectively, using the annotated documents.

Figure 5:
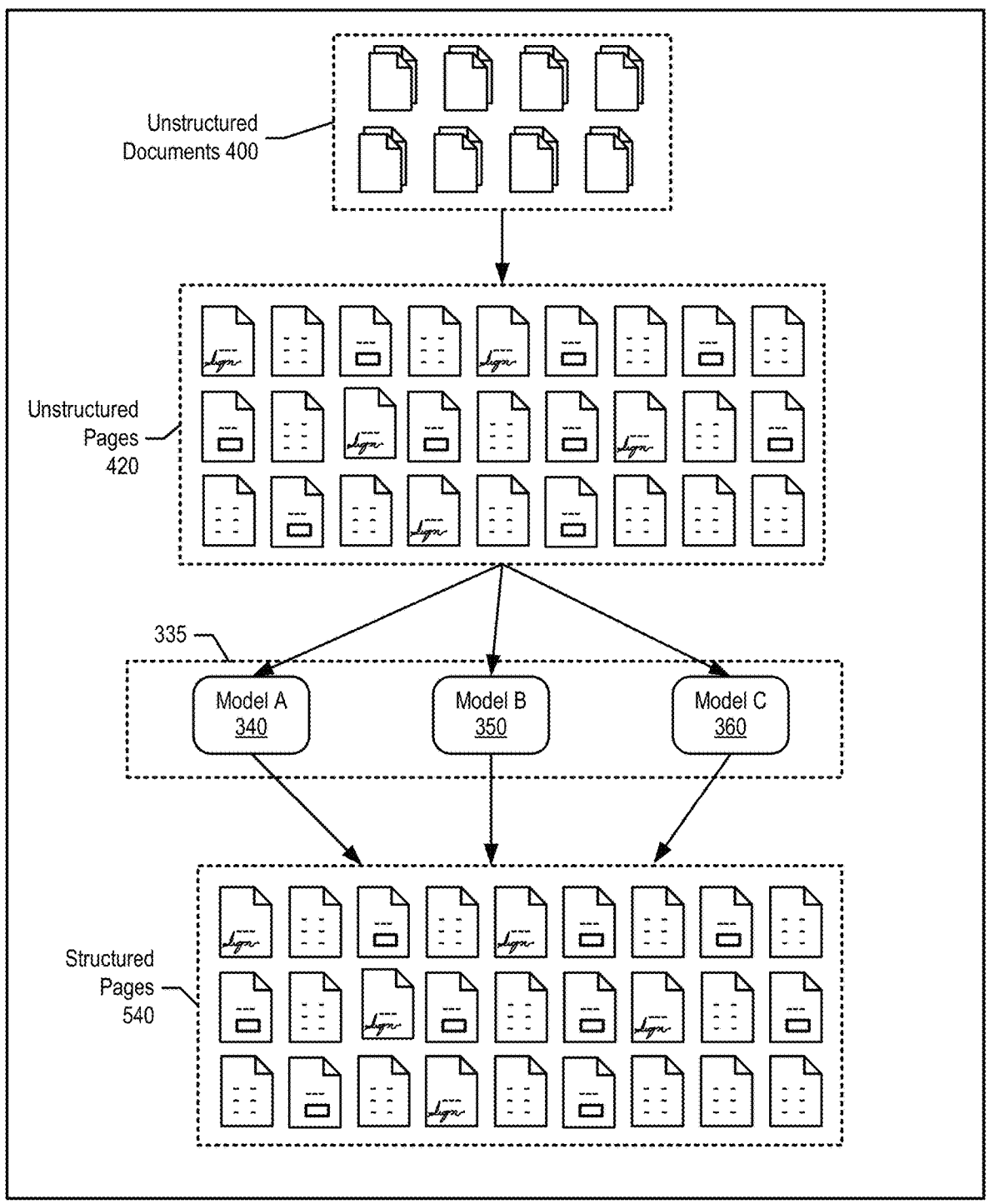
FIG. 5 is an exemplary diagram depicting adaptive document understanding system 300 determining an appropriate machine learning model for each unstructured page and converting each unstructured page to structured pages using their selected machine learning model.

FIG. 5 is an exemplary diagram depicting adaptive document understanding system 300 selecting an appropriate machine learning model for each unstructured page and converting each unstructured page into structured pages using their selected machine learning model. Adaptive document understanding system 300, particularly model inference phase 320, divides unstructured documents 400 into unstructured pages 420. Adaptive document understanding system 300 extracts character areas from each of unstructured pages 420 using a conventional OCR technique or an existing technique implemented in an SDU, and then converts the character areas into feature data $F=\{f_{i,p}\}$ as discussed above, each indicating a format such as the number of character areas, the positions of the areas, the sizes of the areas and the sizes of the characters, etc. (see FIG. 9 and corresponding text for further details).

Then, adaptive document understanding system 300 selects one of unstructured pages 420 and maps the feature vector to feature space 380. Adaptive document understanding system 300 then identifies the closest page cluster center (gct) to the mapped feature vector (see FIG. 11 and corresponding text for further details). Adaptive document understanding system 300 then selects one of models 335 corresponding to the identified closest cluster center, which is the machine learning model trained by the unstructured pages in the corresponding cluster. In turn, adaptive document understanding system 300 converts the selected unstructured page 420 to a structured page 540 using one of the selected models 335. Adaptive document understanding system 300 repeats this process and individually selects one of models 335 for each of unstructured pages 420 to transform unstructured data into structured data.

Figure 6:
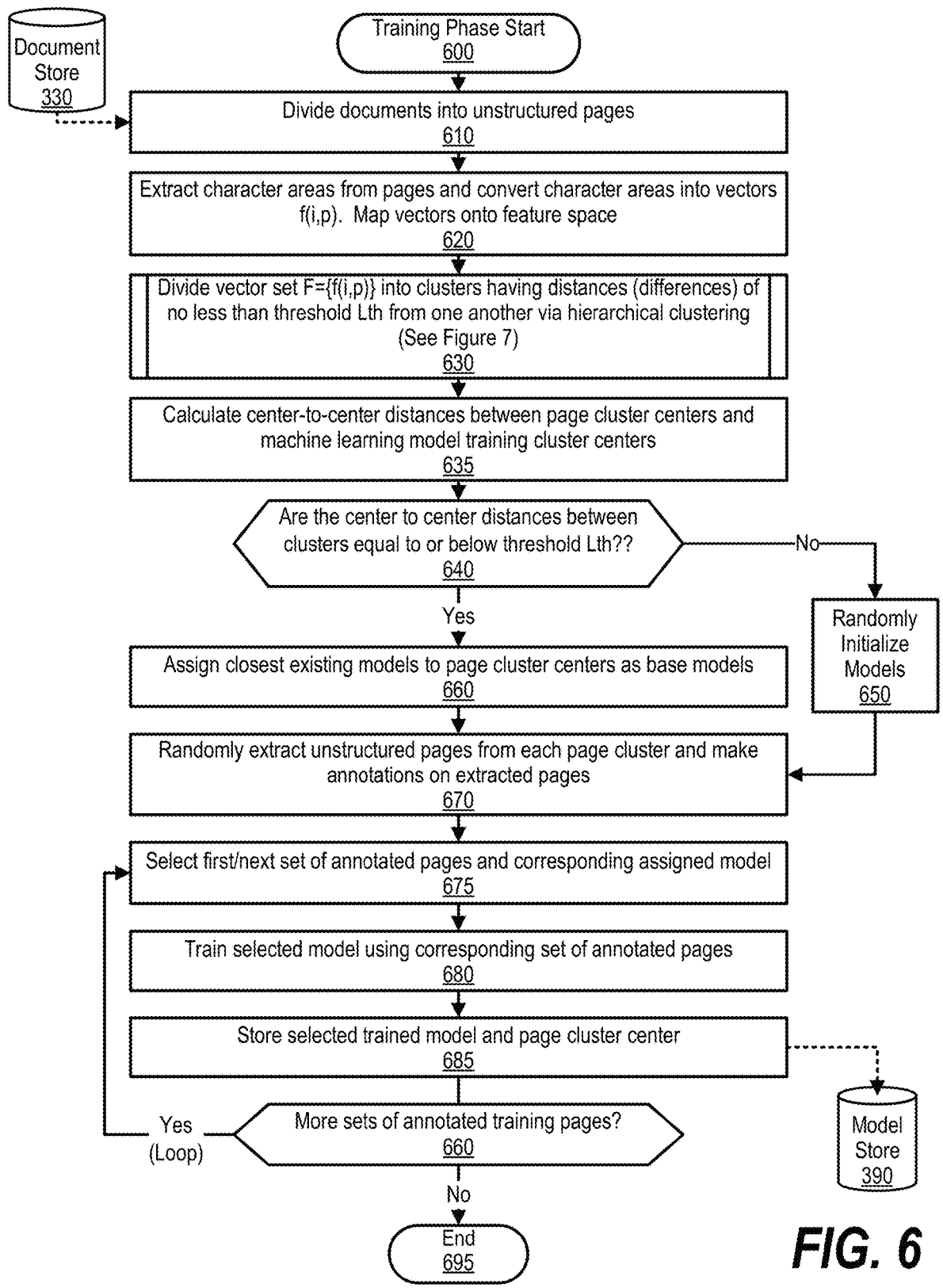
FIG. 6 is an exemplary flowchart showing steps taken to train models 335 using documents 400.

FIG. 6 is an exemplary flowchart showing steps taken to train models 335 using unstructured documents 400. FIG. 6 processing commences at 600 whereupon, at step 610, the process divides unstructured documents 400 from document store 330 into unstructured pages 420. At step 620, the process extracts character areas from pages and converts the character areas into feature vectors f(i,p) (see FIG. 9 and corresponding text for further details). The process then maps the feature vectors onto feature space 380 (see FIG. 10 and corresponding text for further details).

Figure 10:
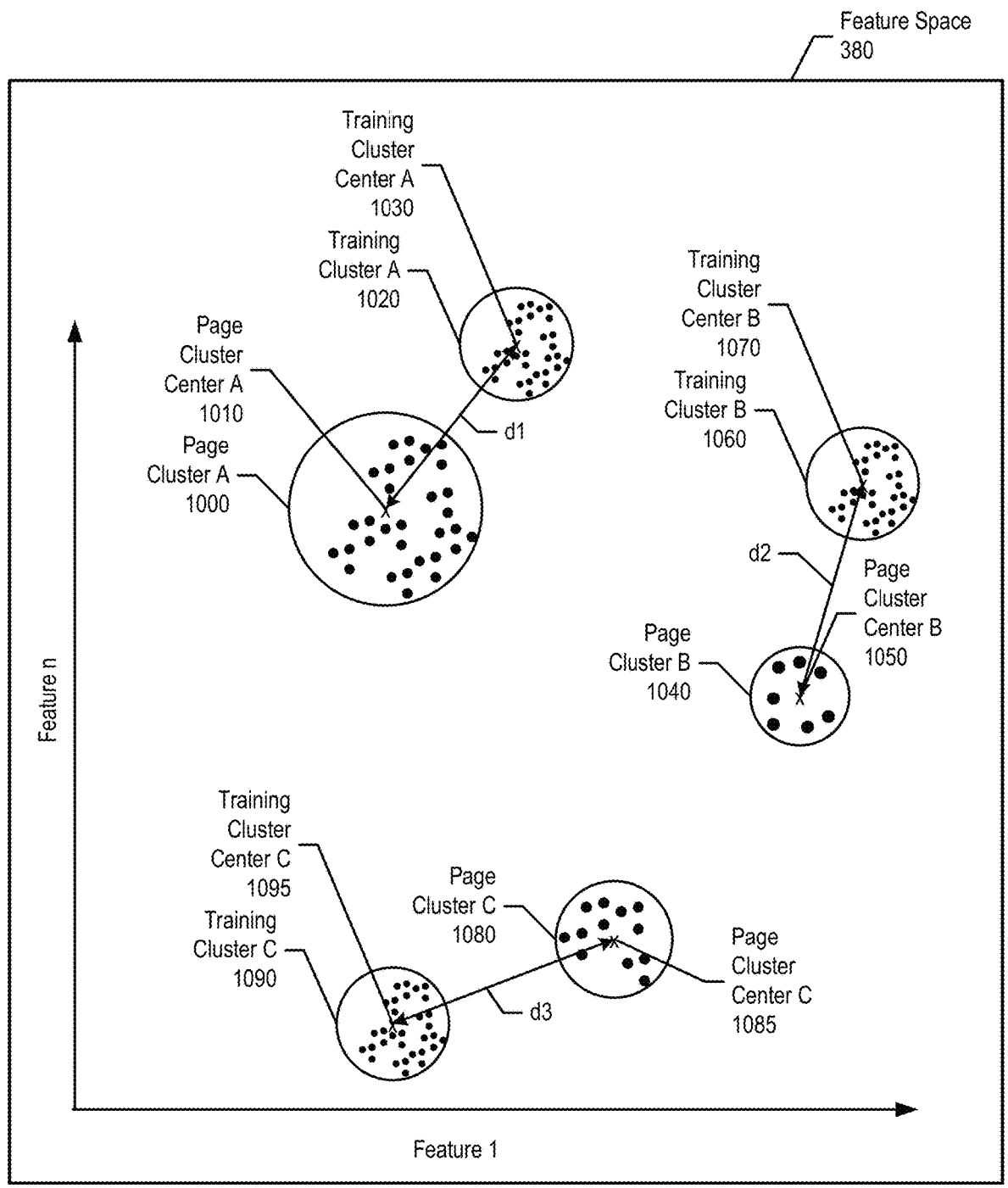
FIG. 10 is an exemplary diagram depicting adaptive document understanding system 300 mapping document pages to feature space during a model training phase.

At pre-defined process block 630, the process uses hierarchical clustering to divide the vector set $F=\{f_{i,p}\}$ into clusters having distances (differences) of no less than a threshold "Lth" from each other (see FIG. 7 and corresponding text for further details). Referring to FIG. 10, the process groups the vectors into page cluster A 1000, page cluster B 1040, and page cluster C 1080.

At step 635, the process calculates center-to-center distances between page cluster centers and training cluster centers that correspond to existing machine learning models (see FIG. 10 and corresponding text for further details). The process determines as to whether the center to center distances between the page cluster centers and the training cluster centers is equal to or below a threshold Lth, such as half of a minimum center-to-center distance between the clusters (decision 640). In other words, in one embodiment, the process determines whether to assign a particular machine learning model to a particular page cluster center. In another embodiment, the process may identify a portion of the page cluster centers that are in proximity to a training cluster center and assign specific machine learning models to some of the page cluster centers while not assigning other page cluster centers to a particular machine learning model.

If the center-to-center distances between page cluster centers and training cluster centers is not equal to or below threshold Lth, then decision 640 branches to the 'no' branch whereupon, at step 650, the process randomly initializes models 335 indicating that no model is trained with individual data because each page cluster is different enough from each training cluster in feature space 380.

On the other hand, if the center to center distances between page cluster centers and training cluster centers is equal to or below the threshold Lth, then decision 640 branches to the 'yes' branch. At step 660, the process assigns the closest existing machine learning models to the page cluster centers as base models for transfer learning and fine-tuning (discussed below). For example, a user may have a machine learning model already trained on papers from "Conference A", and the process uses the machine learning model as a base model to train on papers from "Conference B" to create a new model if the formats of the papers are similar.

At step 670, the process randomly extracts sets of training pages from each page cluster and makes annotations on the extracted pages. At step 675, the process selects the first set of annotated pages and the corresponding machine learning model (e.g., type A samples 430). At step 675, the process trains the selected model using the corresponding set of annotated training pages. Referring to FIG. 4, the process trains model A 340 using annotated type A samples 435.

At step 685, the process stores the trained model in models 335 and stores the page cluster's corresponding page cluster center in model store 390. FIG. 6 processing thereafter ends at 695.

FIG. 7 is an exemplary flowchart showing steps taken to cluster the unstructured pages feature vectors in feature space. FIG. 7 processing commences at 700 whereupon, at step 710, the process selects the first "t" where "t" is an identifier of clusters. Each document belongs to an individual cluster.

At step 720, the process sets feature data f(i,p) of each page as one cluster c(t) and sets a cluster center g(ct)=f(i,p). At step 730, the process calculates distances l(ct,c't) between each pair of g(ct), g(c't) (e.g., Euclidean distance computations). At step 740, the process combines clusters of pairs whose distances l(ct,c't) are smaller than a threshold Lth in ascending order of distance to create a new set of clusters c(t'). At this step, neighbor clusters are merged and created as one new cluster and t' represents a generated new identifier.

The process determines as to whether new clusters are created (decision 750). If new clusters are created, then decision 750 branches to the 'yes' branch. At step 760, for each cluster c(t'), the process calculates a new set of page cluster centers g(c') based on the f(i,p) belonging to page cluster c(t'). The process then loops back to steps 730 and 740 to calculate new distances between the cluster centers and combines clusters if needed. This looping continues until the clusters are adequately separated from each other and there are no more new clusters to create, at which point decision 750 branches to the 'no' branch exiting the loop. FIG. 7 processing thereafter returns to the calling routine at 795 (see FIG. 6 and corresponding text for further details).

Figure 8:
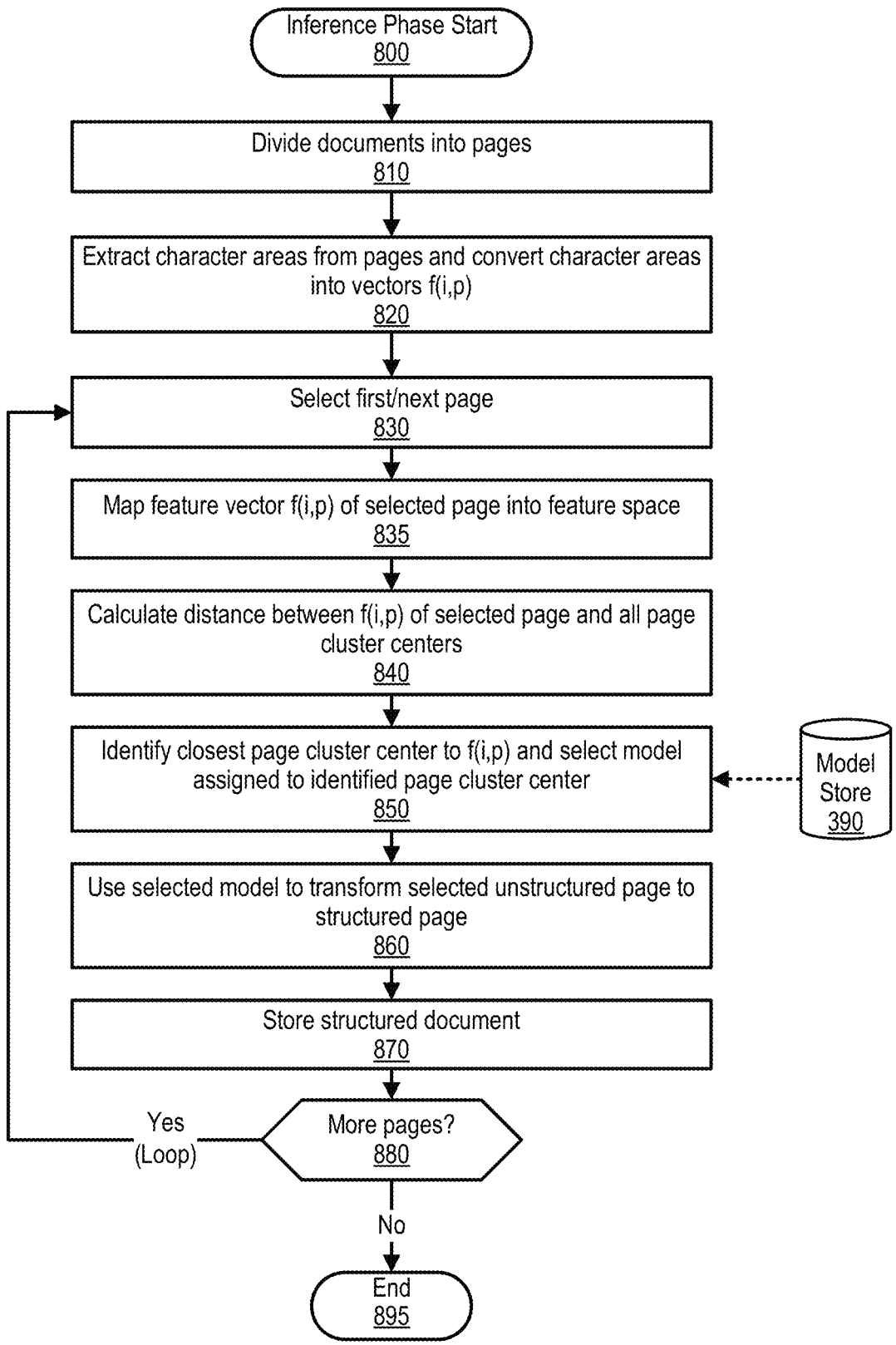
FIG. 8 is an exemplary flowchart showing steps taken to use models 335 for specific model inference of unstructured pages 420.

FIG. 8 is an exemplary flowchart showing steps taken to use models 335 for specific model inference of unstructured pages 420. FIG. 8 processing commences at 800 whereupon, at step 810, the process divides unstructured documents 400 into unstructured pages 420. At step 820, the process extracts character areas from the pages and converts the character areas into feature vectors f(i,p). As discussed earlier, in one embodiment, the process may omit steps 810 and 820 if steps 610 and 620 were recently performed.

At step 830, the process selects the first unstructured page and, at step 835, the process maps the features vector of the selected unstructured page into feature space 380. At step 840, the process calculates distances in feature space 380 between f(i,p) of the selected page and all page cluster centers from the training phase (see FIG. 11 and corresponding text for further details).

At step 850, the process identifies a closest page cluster center to f(i,p) and selects the model assigned to identified page cluster center. Referring to FIG. 11, cluster center A 1010 is closest to feature vector 1110 and, therefore, the process selects model A 340. At step 860, the process uses the selected model to convert the selected unstructured page to a structured page 540. At step 870, the process stores the structured document in document store 330.

The process determines as to whether there are more unstructured pages to transform to structured pages (decision 880). If there are more pages to transform, then decision 880 branches to the 'yes' branch which loops back to select and process the next unstructured page. This looping continues until each of the pages has been processed, at which point decision 880 branches to the 'no' branch exiting the loop. FIG. 8 processing thereafter ends at 895.

FIG. 9 is an exemplary diagram depicting adaptive document understanding system 300 segmenting a page into character areas, creating feature vectors for the character areas, and creating a page feature vector from the character area feature vectors.

Adaptive document understanding system 300 analyzes unstructured page 900 and divides page 900 into three character areas x 910, y 920, and z 930. Then, adaptive document understanding system 300 captures data and location information corresponding to each area using techniques such as OCR discussed above (data x/location x 940, data y/location y 945, data z, location z 950).

Then, adaptive document understanding system 300 uses feature vector generator 960 to generate respective area vectors x 960, y 970, and z 980 based on their corresponding data/location data. Next, feature vector generator 960 combines area vectors x 960, y 970, and z 980 into one feature vector 990 to correspond with unstructured page. Then, adaptive document understanding system 300 creates page feature vector 990 from the character area feature vectors. In one embodiment, adaptive document understanding system 300 i) applies a summation or averaging between character areas that have similar font sizes; ii) uses only the largest N character areas; and/or iii) sorts the vectors of character areas by the surface areas or the coordinates to identify different unstructured page types.

In turn, adaptive document understanding system 300 maps page feature vector 990 to feature space 380 to determine which one of models 330 to select for transforming unstructured page 900 to a structured page (see FIG. 11 and corresponding text for further details).

FIG. 10 is an exemplary diagram depicting adaptive document understanding system 300 mapping unstructured pages to feature space and clustering the mappings during a model training phase. FIG. 10 shows various unstructured page mappings (dots). Adaptive document understanding system 300 clusters the mappings into clusters A 100, cluster B 1020, and cluster C 1040 using, for example, hierarchical clustering steps as shown in FIG. 7. As discussed herein, adaptive document understanding system 300 uses cluster analysis to group a set of mappings in such a way that mappings in the same group are more similar to each other than to those in other groups. The similarity between mappings is often determined using distance measurements over various dimensions in a dataset.

FIG. 10 also shows various training clusters that include feature data (e.g., pages) utilized to initially train models 335. Training cluster A 1020 corresponds to feature data used to train model A 340. Training cluster B 1070 corresponds to feature data used to train model B 350. And, training cluster C 1090 corresponds to feature data used to train model C 360.

Adaptive document understanding system 300 computes distances between page cluster centers and training center clusters to assign the appropriate machine learning model to each page cluster center. FIG. 10 shows that distance d1 is the closest distance between page cluster center A 1010 and training cluster center A 1030. As such, model A 340 is assigned to page cluster center A 1010. Distance d2 is the closest distance between page cluster center B 1050 and training cluster center B 1070. As such, model B 350 is assigned to page cluster center B 1050. And, distance d3 is the closest distance between page cluster center C 1085 and training cluster center C 1095. As such, model C 360 is assigned to page cluster center C 1085.

Once adaptive document understanding system 300 completes the model training phase, adaptive document understanding system 300 uses the feature space locations of page cluster center A 1010, page cluster center B 1050, and page cluster center C 1085 to determine which machine learning model to select for transforming a particular unstructured page to a structured page (see FIG. 11 and corresponding text for further details).

FIG. 11 is an exemplary diagram depicting adaptive document understanding system 300 mapping a page feature vector to feature space and selecting a machine learning model to select for transforming a particular unstructured page to a structured page.

Adaptive document understanding system 300 (e.g., model inference phase 320) generates page feature vector 990 using approaches shown in FIG. 9. Then, adaptive document understanding system 300 computes distances from mapping 1110 to page cluster center A 1010 (distance A), page cluster center B 1050 (distance B), and page cluster center C 1085 femb(distance C). Adaptive document understanding system 300 then selects a suitable machine learning model based on the distance measurements. FIG. 11 shows that distance A is the shorter distance and, therefore, adaptive document understanding system 300 selects model A 340 to apply to unstructured page 900 to transform the page from an unstructured page to a structured page.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
creating a plurality of page clusters in feature space from a plurality of feature vectors corresponding to a plurality of unstructured pages;
assigning one of a plurality of machine learning models to each one of the plurality of page clusters based on a relationship in the feature space between the plurality of page clusters and a plurality of training clusters corresponding to the plurality of machine learning models;
identifying one of the plurality of page clusters that corresponds to a selected one of the plurality of unstructured pages; and
transforming the selected unstructured page into a structured page using a selected one of the plurality of machine learning models assigned to the identified page cluster.

2. The method of claim 1 further comprising:
dividing a plurality of unstructured documents into the plurality of unstructured pages;
selecting one of the plurality of unstructured pages;
defining a set of character areas and a corresponding set of positions in the selected unstructured page; and
computing a set of character area feature vectors corresponding to the set of character areas based on their corresponding set of positions and a set of content within their corresponding character area.

3. The method of claim 2 further comprising:
computing a selected one of the plurality of feature vectors for the selected unstructured page based on the set of character area feature vectors; and
mapping the selected feature vector to the feature space.

4. The method of claim 3 further comprising:
performing hierarchical clustering on the selected feature vector, wherein the hierarchical clustering further comprises:
identifying one of a plurality of page cluster centers corresponding to the plurality of page clusters that is closest in feature space to the selected feature vector; and
adding the selected feature vector to an identified one of the plurality of page clusters corresponding to the identified page cluster center.

5. The method of claim 1 further comprising:
computing a plurality of page cluster centers based on the plurality of page clusters;
computing a plurality of training cluster centers based on the plurality of training clusters;
selecting one of the plurality of page cluster centers;
identifying one of the plurality of training cluster centers closest to the selected page cluster center in the feature space; and
assigning one of the plurality of machine learning models that corresponds to the identified training center cluster to the page cluster corresponding to the selected page cluster center.

6. The method of claim 1 further comprising:
identifying a different one of the plurality of page clusters that corresponds to a different one of the plurality of unstructured pages; and
transforming the different unstructured page into a different structured page using a different one of the plurality of machine learning models assigned to the different page cluster.

7. The method of claim 1 further comprising:
training the selected machine learning model using a portion of the plurality of unstructured documents corresponding to the identified page cluster;
performing the transforming using the trained machine learning model; and
adding the trained machine learning model to the plurality of machine learning models.

8. The method of claim 1 wherein the plurality of unstructured pages comprises a plurality of unstructured page types, and wherein each one of the plurality of unstructured page types is assigned one of the plurality of machine learning models to perform the transforming.

9. An information handling system comprising:
one or more processors;
a memory coupled to at least one of the processors;
a set of computer program instructions stored in the memory and executed by at least one of the processors in order to perform actions of:
creating a plurality of page clusters in feature space from a plurality of feature vectors corresponding to a plurality of unstructured pages;
assigning one of a plurality of machine learning models to each one of the plurality of page clusters based on a relationship in the feature space between the plurality of page clusters and a plurality of training clusters corresponding to the plurality of machine learning models;
identifying one of the plurality of page clusters that corresponds to a selected one of the plurality of unstructured pages; and
transforming the selected unstructured page into a structured page using a selected one of the plurality of machine learning models assigned to the identified page cluster.

10. The information handling system of claim 9 wherein the processors perform additional actions comprising:
dividing a plurality of unstructured documents into the plurality of unstructured pages;
selecting one of the plurality of unstructured pages;
defining a set of character areas and a corresponding set of positions in the selected unstructured page; and
computing a set of character area feature vectors corresponding to the set of character areas based on their corresponding set of positions and a set of content within their corresponding character area.

11. The information handling system of claim 10 wherein the processors perform additional actions comprising:
computing a selected one of the plurality of feature vectors for the selected unstructured page based on the set of character area feature vectors; and
mapping the selected feature vector to the feature space.

12. The information handling system of claim 11 wherein the processors perform additional actions comprising:

performing hierarchical clustering on the selected feature vector, wherein the hierarchical clustering further comprises:
identifying one of a plurality of page cluster centers corresponding to the plurality of page clusters that is closest in feature space to the selected feature vector; and
adding the selected feature vector to an identified one of the plurality of page clusters corresponding to the identified page cluster center.

13. The information handling system of claim 9 wherein the processors perform additional actions comprising:
computing a plurality of page cluster centers based on the plurality of page clusters;
computing a plurality of training cluster centers based on the plurality of training clusters;
selecting one of the plurality of page cluster centers;
identifying one of the plurality of training cluster centers closest to the selected page cluster center in the feature space; and
assigning one of the plurality of machine learning models that corresponds to the identified training center cluster to the page cluster corresponding to the selected page cluster center.

14. The information handling system of claim 9 wherein the processors perform additional actions comprising:
identifying a different one of the plurality of page clusters that corresponds to a different one of the plurality of unstructured pages; and
transforming the different unstructured page into a different structured page using a different one of the plurality of machine learning models assigned to the different page cluster.

15. The information handling system of claim 9 wherein the processors perform additional actions comprising:
training the selected machine learning model using a portion of the plurality of unstructured documents corresponding to the identified page cluster;
performing the transforming using the trained machine learning model; and
adding the trained machine learning model to the plurality of machine learning models.

16. The information handling system of claim 9 wherein the plurality of unstructured pages comprises a plurality of unstructured page types, and wherein each one of the plurality of unstructured page types is assigned one of the plurality of machine learning models to perform the transforming.

17. A computer program product stored in a computer readable storage medium, comprising computer program code that, when executed by an information handling system, causes the information handling system to perform actions comprising:
creating a plurality of page clusters in feature space from a plurality of feature vectors corresponding to a plurality of unstructured pages;
assigning one of a plurality of machine learning models to each one of the plurality of page clusters based on a relationship in the feature space between the plurality of page clusters and a plurality of training clusters corresponding to the plurality of machine learning models;
identifying one of the plurality of page clusters that corresponds to a selected one of the plurality of unstructured pages; and
transforming the selected unstructured page into a structured page using a selected one of the plurality of machine learning models assigned to the identified page cluster.

18. The computer program product of claim 17 wherein the information handling system performs further actions comprising:
dividing a plurality of unstructured documents into the plurality of unstructured pages;
selecting one of the plurality of unstructured pages;
defining a set of character areas and a corresponding set of positions in the selected unstructured page; and
computing a set of character area feature vectors corresponding to the set of character areas based on their corresponding set of positions and a set of content within their corresponding character area.

19. The computer program product of claim 18 wherein the information handling system performs further actions comprising:
computing a selected one of the plurality of feature vectors for the selected unstructured page based on the set of character area feature vectors; and
mapping the selected feature vector to the feature space.

20. The computer program product of claim 19 wherein the information handling system performs further actions comprising:
performing hierarchical clustering on the selected feature vector, wherein the hierarchical clustering further comprises:
identifying one of a plurality of page cluster centers corresponding to the plurality of page clusters that is closest in feature space to the selected feature vector; and
adding the selected feature vector to an identified one of the plurality of page clusters corresponding to the identified page cluster center.

21. The computer program product of claim 17 wherein the information handling system performs further actions comprising:
computing a plurality of page cluster centers based on the plurality of page clusters;
computing a plurality of training cluster centers based on the plurality of training clusters;
selecting one of the plurality of page cluster centers;
identifying one of the plurality of training cluster centers closest to the selected page cluster center in the feature space; and
assigning one of the plurality of machine learning models that corresponds to the identified training center cluster to the page cluster corresponding to the selected page cluster center.

22. The computer program product of claim 17 wherein the information handling system performs further actions comprising:
identifying a different one of the plurality of page clusters that corresponds to a different one of the plurality of unstructured pages; and
transforming the different unstructured page into a different structured page using a different one of the plurality of machine learning models assigned to the different page cluster.

23. The computer program product of claim 17 wherein the information handling system performs further actions comprising:
training the selected machine learning model using a portion of the plurality of unstructured documents corresponding to the identified page cluster;

performing the transforming using the trained machine learning model; and adding the trained machine learning model to the plurality of machine learning models.

24. The computer program product of claim 17 wherein the plurality of unstructured pages comprises a plurality of unstructured page types, and wherein each one of the plurality of unstructured page types is assigned one of the plurality of machine learning models to perform the transforming.

25. A computer-implemented method comprising:

dividing each of a plurality of unstructured documents into a plurality of unstructured pages;

computing a plurality of feature vectors for the plurality of unstructured pages;

mapping each of the plurality of feature vectors to a feature space, wherein the feature space also comprises a plurality of training cluster centers corresponding to a plurality of sets of training data utilized to train a plurality of machine learning models;

creating a plurality of page clusters in the feature space from the plurality of feature vectors;

computing a plurality of page cluster centers based on the plurality of page clusters;

determining a selected one of the plurality of training cluster centers that is closest in the feature space to a selected one of the plurality of page cluster centers;

identifying one of the plurality of machine learning models that corresponds to the selected training cluster center;

assigning the identified machine learning model to the selected page cluster center;

selecting one of the plurality of feature vectors corresponding to a selected one of the plurality of unstructured pages;

mapping the selected feature vector in the feature space;

in response to determining that the selected page cluster center is closest in the feature space to the selected feature vector, using the identified machine learning model to transform the selected unstructured page into a structured page.

* * * * *